United States Patent
Barrick et al.

(10) Patent No.: US 7,464,242 B2
(45) Date of Patent: Dec. 9, 2008

(54) METHOD OF LOAD/STORE DEPENDENCIES DETECTION WITH DYNAMICALLY CHANGING ADDRESS LENGTH

(75) Inventors: Brian David Barrick, Pflugerville, TX (US); Dwain Alan Hicks, Pflugerville, TX (US); Takeki Osanai, Austin, TX (US); David Scott Ray, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 413 days.

(21) Appl. No.: 11/050,039

(22) Filed: Feb. 3, 2005

(65) Prior Publication Data

US 2006/0174083 A1    Aug. 3, 2006

(51) Int. Cl.
*G06F 12/00* (2006.01)
(52) U.S. Cl. .................. 711/169; 711/140; 711/156; 712/23; 712/216; 712/217; 712/218; 712/219
(58) Field of Classification Search .................. 711/169
See application file for complete search history.

(56) References Cited

U.S. PATENT DOCUMENTS

| | | | | |
|---|---|---|---|---|
| 4,860,192 A | * | 8/1989 | Sachs et al. ..................... | 711/3 |
| 5,644,752 A | * | 7/1997 | Cohen et al. ................. | 711/122 |
| 5,761,506 A | * | 6/1998 | Angle et al. ................. | 718/102 |
| 5,809,530 A | * | 9/1998 | Samra et al. ................. | 711/140 |
| 5,961,628 A | * | 10/1999 | Nguyen et al. ................. | 712/2 |
| 6,079,005 A | * | 6/2000 | Witt et al. ................... | 711/213 |
| 6,360,314 B1 | * | 3/2002 | Webb et al. ................. | 712/219 |
| 6,662,280 B1 | * | 12/2003 | Hughes ....................... | 711/156 |
| 6,859,860 B2 | * | 2/2005 | Saito et al. .................. | 711/118 |

* cited by examiner

*Primary Examiner*—Hyung Sough
*Assistant Examiner*—Kaushikkumar Patel
(74) *Attorney, Agent, or Firm*—Carr LLP; Matt Talpis

(57) ABSTRACT

A method, an apparatus, and a computer program product are provided for detecting load/store dependency in a memory system by dynamically changing the address width for comparison. An incoming load/store operation must be compared to the operations in the pipeline and the queues to avoid address conflicts. Overall, the present invention introduces a cache hit or cache miss input into the load/store dependency logic. If the incoming load operation is a cache hit, then the quadword boundary address value is used for detection. If the incoming load operation is a cache miss, then the cacheline boundary address value is used for detection. This invention enhances the performance of LHS and LHR operations in a memory system.

14 Claims, 4 Drawing Sheets

METHOD OF LOAD/STORE DEPENDENCIES DETECTION WITH DYNAMICALLY CHANGING ADDRESS LENGTH

FIELD OF THE INVENTION

The present invention relates generally to optimization of a mechanism to detect load/store dependency, and more particularly, to changing address length for optimization of load/store dependency detection.

DESCRIPTION OF THE RELATED ART

Memory systems contain a mechanism to control load/store dependency. Load-Hit-Store (LHS) and Load-Hit-Reload (LHR) operations are necessary in load/store systems to deal with address conflicts. Address conflicts result from large amounts of load/store operations to the same address. The problem is that some of the load/store operations may be ordered to the same address as older load or store operations. To ensure accurate data, the older operations must be accomplished before the newer operations. This type of a conflict can lead to the transmission or storage of inaccurate data.

A conventional mechanism that handles load/store dependency contains a pipeline of load and store commands, a large number of different types of comparators, a load miss queue, a store queue and load/store dependency logic. LHS and LHR operations are used within this framework to resolve address conflicts involving address matches. A LHS operation is utilized when an incoming operation is a load operation and the system detects that it has an address match with an older store operation which is in the pipeline or the store queue. The LHS operation ensures that the new load operation does not execute before the older store operation is accomplished. A LHR operation is utilized when an incoming operation is a load operation and the system detects that it has an address match with an older load operation which is in the pipeline or the load miss queue. A newer load operation should not be executed before the older load is accomplished to the same address.

LHS and LHR operations wait until the older operations finish and are then sent back to the pipeline for execution. Therefore, LHS operations are accomplished after the dependent stores are finished, and LHR operations are accomplished after the dependent loads are finished. This process ensures that the hierarchy of load and store commands is maintained within a system, and consequently, ensures the accurate transmission and storage of data in these systems.

SUMMARY OF THE INVENTION

The present invention provides a method, an apparatus, and a computer program product for detecting load/store dependency by dynamically changing the address width for address comparisons. An incoming load/store operation must be compared to the operations in the pipeline and the queues to avoid address conflicts. Load/store dependencies must be resolved before the incoming operations are executed. Overall, the present invention introduces a cache hit or cache miss input into the load/store dependency logic. If the incoming load operation is a cache hit, then the quadword boundary address value is used for detection. If the incoming load operation is a cache miss, then the cacheline boundary address value is used for detection. By dynamically changing the address width LHR and LHS operations perform better.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electro-magnetic signaling techniques, and the like, have been omitted inasmuch as such details are not considered necessary to obtain a complete understanding of the present invention, and are considered to be within the understanding of persons of ordinary skill in the relevant art.

It is further noted that, unless indicated otherwise, all functions described herein may be performed in either hardware or software, or some combination thereof. In a preferred embodiment, however, the functions are implemented in hardware in order to provide the most efficient implementation. Alternatively, the functions may be performed by a processor such as a computer or an electronic data processor in accordance with code such as computer program code embodied a computer readable medium, software, and/or integrated circuits that are coded to perform such functions, unless indicated otherwise.

Figure 1:
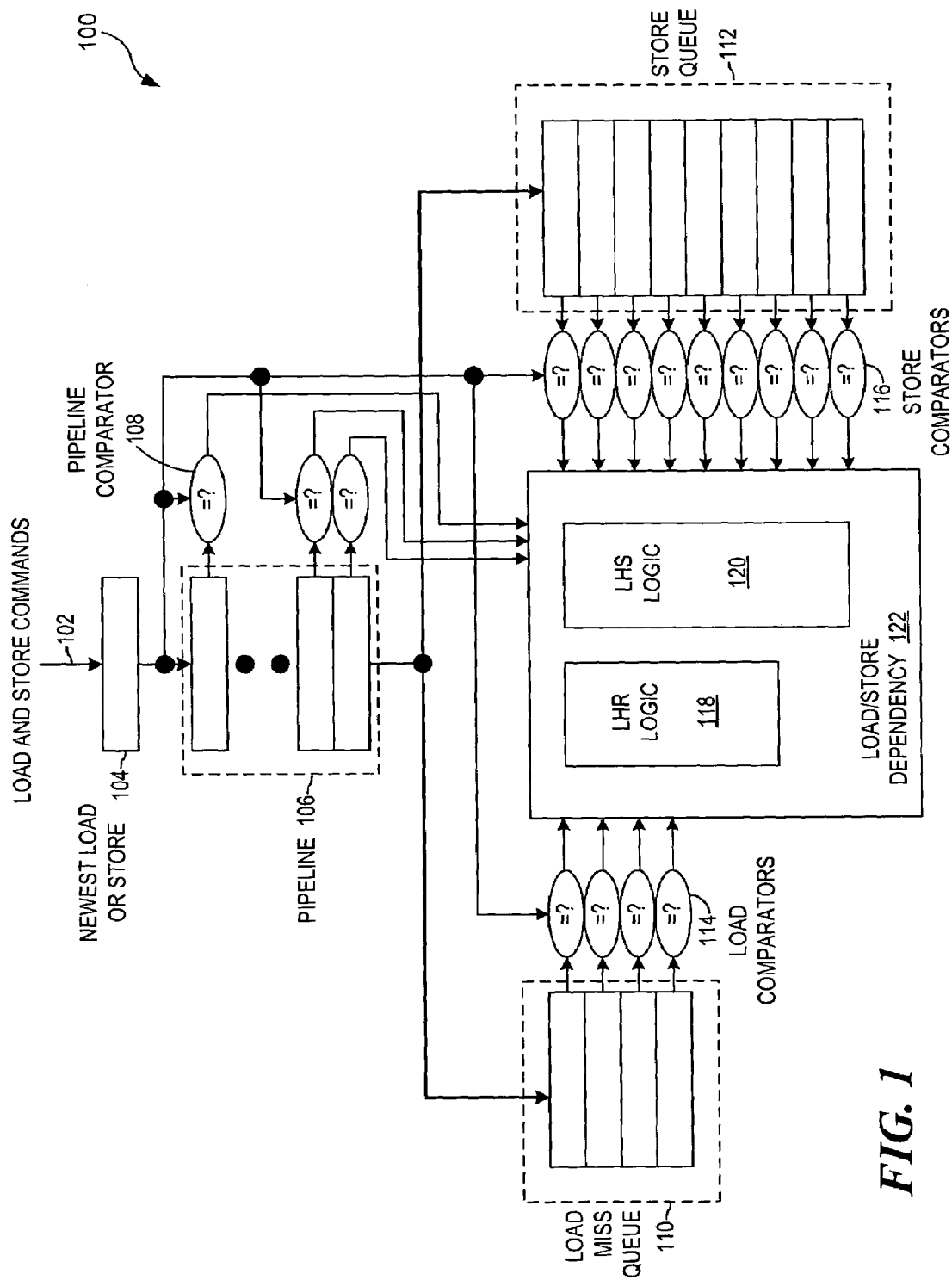
FIG. 1 is a block diagram illustrating an apparatus designed to handle load/store dependency in a memory system.

Referring to FIG. 1 of the drawings, reference numeral 100 is a block diagram illustrating an apparatus designed to handle load/store dependency in a memory system. The load and store commands 102 proceed in order to the pipeline 106. The load and store operations stage through the pipeline 106, where it is determined whether the specific operation can be executed immediately or needs to drop to the queues. The newest load or store 104 signifies where the address calculations are performed. The address of the newest load or store 104 is compared to the addresses of the operations in the pipeline 106, the load miss queue 110, and the store queue 112. Operations with an address match could result in data integrity problems if they are not handled properly. To avoid this problem LHS and LHR operations are issued, so that older load/store commands can be accomplished before the more recent, dependent load commands are issued. The LHR Logic 118 and the LHS Logic 120 handle the LHR and LHS operations, respectively.

As the newest load or store 104 prepares to enter the pipeline, its address must be compared to the operations in the pipeline 106, the load miss queue 110, and the store queue 112. Accordingly, the pipeline comparators 108 compare the newest load or store 104 to the pipeline operations 106, the load comparators 114 compare the newest load or store 104 to the load miss queue operations 110, and the store comparators}

116 compare the newest load or store 104 to the store queue operations 112. These comparisons are necessary to detect address collisions and to prevent the newest load or store 104 from being executed before an older operation that is an address match.

The comparators 108, 114, and 116 do a raw comparison to determine if the address value in the newest operation 104 is an address match to the operations in the pipeline 106, the load miss queue 110, or the store queue 112. If the address value of the newest operation 104 matches an address value in the pipeline 106, the load miss queue 110, or the store queue 112, then the matching comparator outputs a digital value to signal a match. In contrast, if the address value of the newest operation 104 does not match an address value in the pipeline 106, the load miss queue 110, or the store queue 112, then all of the comparators output the opposite digital value. For one embodiment, in the case of an address match a comparator outputs a "1," and if there is no address match then the comparator outputs a "0." The digital values from the comparators are transmitted to the load/store dependency logic 122.

The comparators 108, 114, and 116 in conjunction with the load/store dependency logic 122 determine whether the newest load or store command 104 should result in a LHS or a LHR operation. If the newest operation 104 is a load operation and the system detects an address match with an older store in the pipeline 106 or the store queue 112, then a LHS is detected. If the newest operation 104 is a load operation and the system detects that it has an address match with an older load in the pipeline 106 or the load miss queue 110, then a LHR is detected.

Another input provided to the load/store dependency logic 122 is whether the newest load or store command 104 is an L1 cache hit or miss. L1 refers to a level of cache hierarchy within the memory system. For this embodiment, L1 stands for the first level within a cache hierarchy. An L1 cache hit signifies that the newest load or store command 104 contains an address value whose corresponding data is within the L1 cache. An L1 miss signifies that the newest load or store command 104 contains an address value whose corresponding data is not within the L1 cache. In case of an L1 miss the memory system might have to get the data associated with the address from a lower cache level within the system.

Store operations always drop to the store queue, whether the store operation is an L1 hit or miss. Load operations with an L1 hit and no other dependencies in the pipeline 106 or the queues 110 or 112 are able to execute immediately. A load operation with no dependencies and an L1 miss drop to the load miss queue 110. In this situation the load miss queue 110 sends requests out to the next level of memory hierarchy to fetch the line back. Once the data is returned, the load operation may complete execution and exit the load miss queue 110. A load operation that exhibits dependencies with operations within the pipeline 106 or the queues 110 or 112 is also sent to the load miss queue 110. Therefore, LHS and LHR are sent to the load miss queue 110. A LHS and a LHR remain in the load miss queue until the operation can be executed.

The load/store dependency logic 122 receives the values from the comparators, combines these values, and produces the commands that control the load/store dependency in this type of memory system. Valid bits for pipeline, load queue, and store queue address values come from the pipeline 106, the load queues 110 and store queues 112, respectively.

Figure 2:
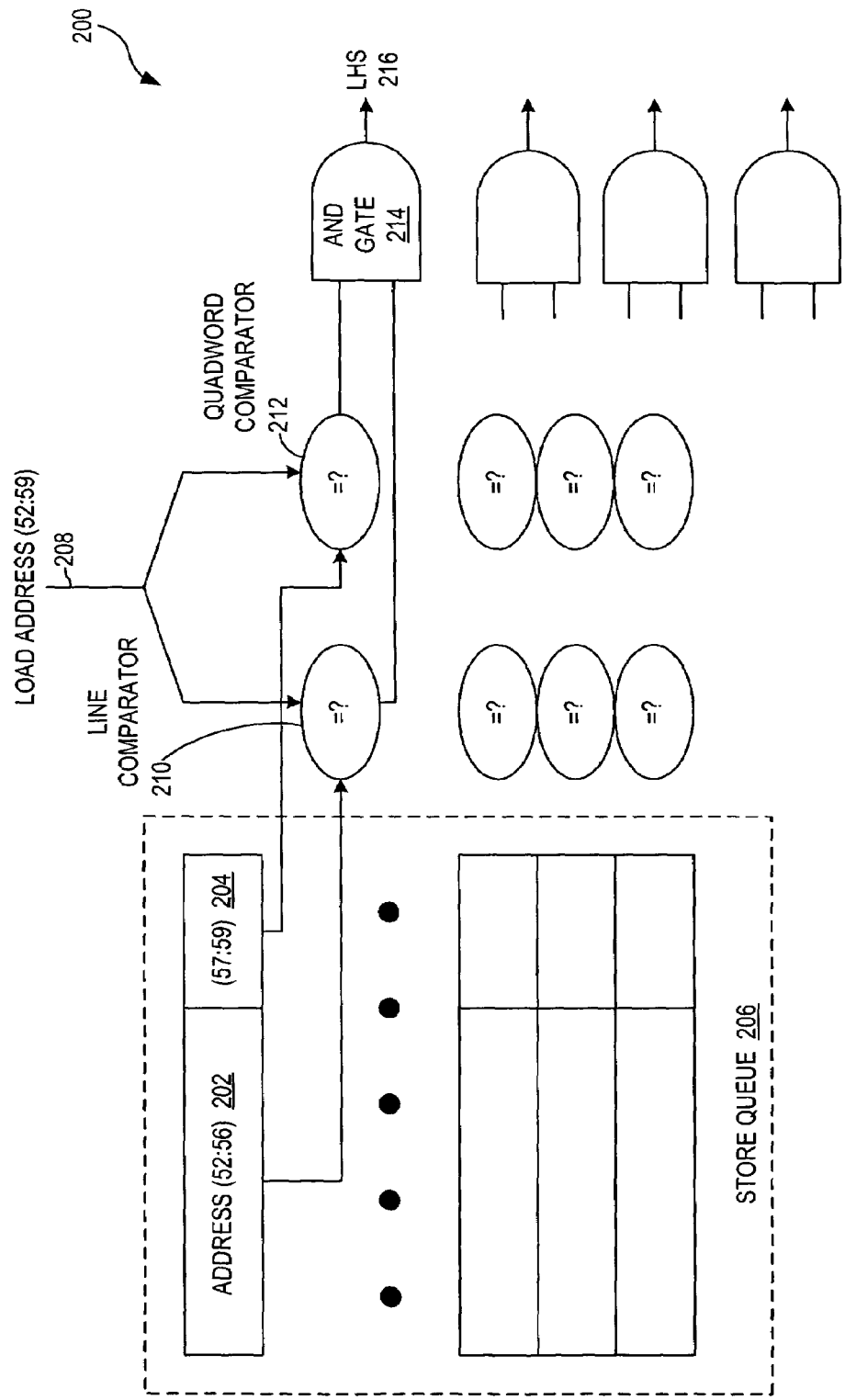
FIG. 2 is a block diagram illustrating a conventional apparatus designed to detect LHS operations.

Referring to FIG. 2 of the drawings, reference numeral 200 is a block diagram illustrating a conventional apparatus designed to detect LHS operations. The load address 208 refers to the address value of the newest load or store 104 in FIG. 1. The numbers (52:59) in the load address 208 refer to the address boundary. For one embodiment, the numbers 52:56 (202) refer to the cacheline boundary, which is the cacheline boundary value within the L1 cache level. The numbers 57:59 (204) refer to the quadword boundary, which is the quadword boundary value within the specific cacheline. An address match indicates that a specific range of address bits are the same. A cacheline address match indicates that the 52:56 address bits are the same. A quadword address match indicates that the 52:59 address bits are the same. These numbers could contain different values depending on how the L1 cache is addressed and are only used to describe this embodiment. The length of the cacheline boundary and the quadword boundary could be different, and these lengths are only used to describe this embodiment. Overall, the load address 208 contains a specific cacheline value and a quadword value. In other embodiments, the quadword boundary could be substituted with a smaller boundary. Word boundaries or byte boundaries could be utilized to identify addresses within the cacheline.

This is a simplified example of the cacheline and quadword comparison. Some operations may be misaligned or longer than a quadword. In these cases the data may cross over one quadword and modify the quadword comparison. For this embodiment, the normal 57:59 quadword comparison is changed to a 57:58 comparison if the operation is misaligned or longer than a quadword. Other embodiments may change to a cacheline comparison to resolve this issue.

The store queue 206 refers to the address values of the commands within the store queue 112 of FIG. 1. The address value 202 signifies the cacheline boundary and the address value 204 signifies the quadword boundary of one store operation within the store queue 206. The line comparator 210 receives the address value 202 and the cacheline boundary value of the load address 208 as inputs. If the cacheline boundary address values 202 and 208 are the same, then the line comparator 210 outputs a "1," which signifies a match. The quadword comparator 212 receives the address value 204 and the quadword boundary value of the load address 208 as inputs. If the quadword boundary address values 204 and 208 are the same, then the quadword comparator 212 outputs a "1," which signifies a match. The outputs of the line comparator 210 and the quadword comparator 212 are inputs to an AND gate 214. If the load address 208 and the address value of the command in the store queue 206 match, then the AND gate 214 produces a "1." If a "1" is the output, a LHS operation 216 is issued because of the address match. If a "0" is the output, a LHS operation 216 is not issued because there is no address match.

In FIG. 2, the line comparators 210 and the quadword comparators 212 refer to the store comparators 116 in FIG. 1. The AND gate 214 represents the simplified LHS logic 120. The fact that the load address is an L1 hit or miss is not accounted for in the conventional method of detecting LHS operations. LHS operations in this example are detected as a quadword boundary, which means that the cacheline boundary value and the quadword boundary value are compared to determine if there is an address match. Alternatively, LHS operations can also be detected as a cacheline boundary, which means that only the cacheline boundary value is compared in the detection. In addition, LHR operations can be compared as cacheline boundaries or quadword boundaries.

The conventional methods of LHS and LHR operations present some performance problems. The LHS operations that use a quadword boundary for detection encounter a problem when there is an L1 miss. In this case the younger load miss accesses the same cacheline as the old store miss's line but on a different quadword. Therefore, the LHS detector that is using quadword boundary does not work and the younger load miss can go ahead of the older store, to generate a L1 reload. Here the younger load itself does not wait until the older store finishes because the younger load and the older store do not overlap each other (different quadwords). A reloaded line to the L1 cache by the younger load miss needs to have the older store's data if the reloaded line allocates on the L1. In this situation a LHS with an L1 miss can lead to an inaccurate result because the L1 cache data is stale.

In addition, the conventional LHS and LHR methods produce some performance problems when a cacheline boundary is used for detection. For example, there is LHR detection with an L1 hit to the same cacheline value as an older load operation. With only the cacheline value available, there is LHR detection even if the two load commands occupy different quadwords on the same cacheline. If the two load commands do not overlap on the same cacheline then these commands do not need to be accomplished in program order. This situation leads to a slower system performance for conventional LHS or LHR operations that use cacheline boundary because the new LHS or LHR operation must wait for the older load to finish.

Figure 3:
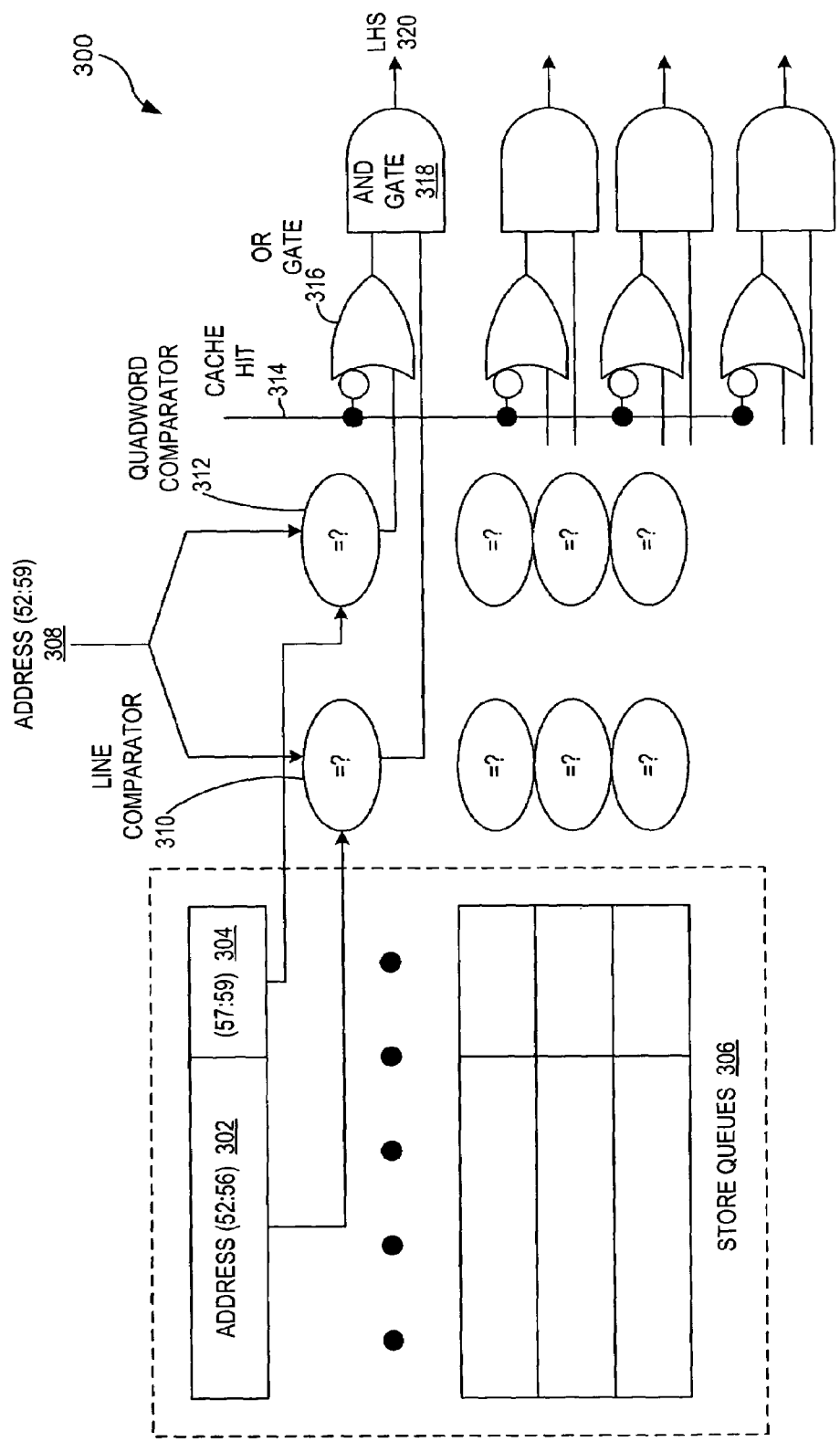
FIG. 3 is a block diagram illustrating a modified apparatus designed to detect LHS operations.

Referring to FIG. 3 of the drawings, reference numeral 300 is a block diagram illustrating a modified apparatus designed to detect LHS operations. The load address 308 refers to the address value of the newest load or store 104 in FIG. 1. The numbers (52:59) in the load address 308 refer to the address boundary value. For an example, the numbers 52:56 (302) refer to the cacheline boundary, which is the cacheline value within the cache level. The numbers 57:59 (304) refer to the quadword boundary, which is the quadword boundary within the specific cacheline. Overall, the load address 308 contains a specific cacheline value and a quadword value.

The store queue 306 refers to the address values of the commands within the store queue 112 of FIG. 1. The address value 302 signifies the cacheline boundary and the address value 304 signifies the quadword boundary. The line comparator 310 receives the address value 302 and the cacheline boundary value of the load address 308 as inputs. If the cacheline boundary address values 302 and 308 are the same, then the line comparator 310 outputs a "1," which signifies a match. The quadword comparator 312 receives the address value 304 and the quadword boundary value of the load address 308 as inputs. If the quadword boundary address values 304 and 308 are the same, then the quadword comparator 312 outputs a "1," which signifies a match.

This modified LHS logic 300 also utilizes another input. The cache hit line 314 refers to an L1 hit or miss as previously described. If the load address value 308 is an L1 cache hit then the cache hit line 314 produces a "1." If the load address value 308 is an L1 cache miss then the cache hit line 314 produces a "0." This result is inverted and fed into an OR gate 316. The OR gate 316 also receives the quadword comparator 312 output as an input. Accordingly, if there is an L1 cache miss, then the OR gate 316 always outputs a "1." If there is an L1 cache hit, then the OR gate 316 outputs the value of the quadword comparator 312 output.

The output of the OR gate 316 is transmitted to the AND gate 318 as an input. The output of the line comparator 310 is also an input to the AND gate 318. The output of the AND gate 318 is the LHS operation 320. The OR gate 316 and the AND gate 318 represent the simplified LHS logic 120 of FIG. 1. Overall, the cache hit line 314 introduces another input into the LHS logic 300. If the load address value 308 is an L1 cache hit, then this LHS logic 300 performs exactly like the prior art 200 by evaluating the cacheline value and the quadword value. If the load address value 308 is an L1 cache miss, then this LHS logic 300 solely interprets the line comparator 310 output. Therefore, for an L1 hit the LHS logic detects an address using quadword boundary, and for an L1 miss the LHS logic detects an address using cacheline boundary. This logic structure only depicts one embodiment of the present invention, and many different implementations can achieve the ultimate result.

This is the difference between the present invention and the prior art. The prior art methods of load/store dependency detections used the cacheline boundary or the quadword boundary exclusively. The dynamically changing address length is a vast improvement over the prior art. If the LHS operation is an L1 cache hit, then the LHS logic 300 interprets the cacheline boundary and the quadword boundary to determine if there is an address match. If the LHS operation is an L1 cache miss, then the LHS logic 300 interprets solely the cacheline boundary to determine address matches. The modified LHR operation is handled in the same manner. If the LHR operation is an L1 cache hit, then the LHR logic interprets the cacheline boundary and the quadword boundary to determine if there is an address match. If the LHR operation is an L1 cache miss, then the LHR logic interprets solely the cacheline boundary to determine address matches. By introducing the cache hit line 314 as an additional input, the problems of the conventional LHS and LHR operations are solved without the use of complicated logic.

Previously, the LHS operations encounter a problem when there is an L1 miss. In this case the younger load miss accesses the same line as the old store miss's line but on a different quadword. Therefore, the LHS detector that is using quadword boundary does not work and the younger load miss can go ahead of the older store, to generate a L1 reload. This can cause inaccurate results. In this modified LHS operation with an L1 miss only the cacheline boundary is interpreted. Therefore, a younger load miss to the same cacheline is captured by the LHS detection logic. The younger load is sent to the miss queue, and the younger load miss can not go ahead of the older store, to generate an L1 reload. Inaccurate results are avoided for a LHS operation with an L1 miss.

Previously, the LHR and the LHS operations display performance problems when there is an L1 hit. In this case there is an LHR detection with an L1 hit to the same cacheline boundary value. With only the cacheline boundary value available, there is LHR detection even if the two load commands occupy different quadword boundaries on the same cacheline. If the two load commands do not overlap on the same cacheline then these commands do not need to be accomplished in program order. This problem is solved by the use of the L1 cache hit line 314 input. If an LHR operation produces an L1 hit, then the quadword boundary is interpreted. Therefore, if the quadword boundaries are different then there is no LHR detection. Since program order is not important unless the younger load and the older load have the same quadword boundary, the younger load does not need to be dependent upon the older load. In this situation, the modified LHR operation performs faster and more efficient. Accordingly, the present invention also improves the performance of LHS operations with an L1 hit in this system in the same manner.

The changing of address ranges in this modified load/store dependency mechanism is handled by the load/store dependency logic 122 in conjunction with the LHR logic 118 and the LHS logic 120 from FIG. 1. Overall, for LHS operations and LHR operations the cacheline boundary and the quadword boundary are interpreted in the case of an L1 hit. For LHS operations and LHR operations only the cacheline boundary is interpreted in the case of an L1 miss. This dynamic change of address comparison width enhances the mechanism to solve the case that a younger load accesses the same line before an older store miss for the LHS operation. Furthermore, the dynamic change of address comparison width improves system performance of the LHS operation and LHR operation in the case of a L1 hit.

In another embodiment of the present invention, the store queue and the load miss queue are combined together to form one queue. This type of a queue would perform similar to a pipeline. Furthermore, another embodiment may not utilize a queue. These systems may reject or flush these dependent operations and re-issue them.

Figure 4:
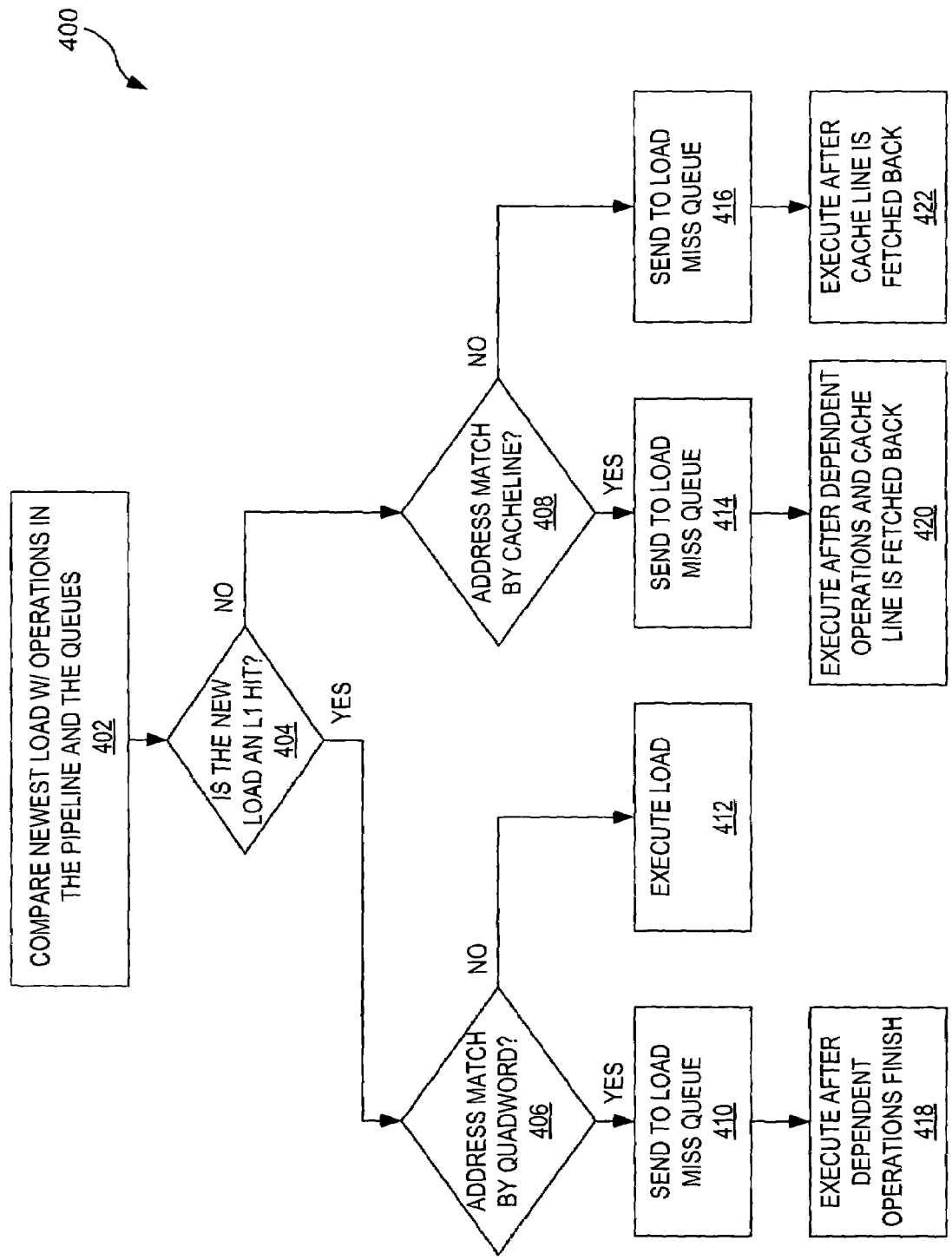
FIG. 4 is a flow chart depicting the method of managing the detection of load/store dependencies with dynamically changing address lengths.

Referring to FIG. 4 of the drawings, reference numeral 400 is a flow chart depicting the method of managing the detection of load/store dependencies with dynamically changing address lengths. The first step is to compare the newest load operation with the operations in the pipeline and the queues 402. Is the newest load an L1 hit 404? If the newest load is an L1 hit, then the system uses the quadword boundary to detect an address match 406. If the newest load is not an L1 hit, then the system uses the cacheline boundary to detect an address match 408. In this flow chart LHS and LHR operations are handled the same.

If the newest load is an L1 hit and a quadword address match, then the load operation is sent to the load miss queue 410. From there the load operation is executed after the dependent operations are finished 418. If the newest load is an L1 hit, but does not show a quadword address match, then the load operation is executed 412. If the newest load is an L1 miss and a cacheline address match, then the load operation is sent to the load miss queue 414. From there the load operation is executed after the dependent operations are finished and the cache line is fetched back 420. If the newest load is an L1 miss, but does not show a cacheline address match, then the load operation is sent to the load miss queue 416. From there the load operation is executed after the cache line is fetched back 422.

It is understood that the present invention can take many forms and embodiments. Accordingly, several variations of the present design may be made without departing from the scope of the invention. The capabilities outlined herein allow for the possibility of a variety of programming models. This disclosure should not be read as preferring any particular programming model, but is instead directed to the underlying concepts on which these programming models can be built.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

The invention claimed is:

1. A method for detecting load/store dependencies of load/store operations in a memory system containing at least one pipeline of operations, comprising:
   determining whether address value of an incoming load operation is a cache hit or a cache miss;
   upon a determination that the incoming load operation is the cache hit, comparing the address value of the incoming load operation to the operations in the at least one pipeline to determine an address match by using a specific address width wherein the specific address width is a quadward boundary address width;
   upon a determination that the incoming load operation is the cache miss, comparing the address value of the incoming load operation to the operations in the at least one pipeline to determine the address match by using a smaller address width wherein the smaller address width is a cacheline boundary address width;
   executing the incoming load operation if the load operation is the cache hit and shows no address match;
   storing the incoming load operation if the load operation is the cache miss and the address match; and
   executing the stored load operation after the load/store dependencies and cache dependencies have been resolved.

2. The method of claim 1, wherein the at least one pipeline further comprises at least one queue.

3. The method of claim 2, wherein the at least one queue further comprises at least one load miss queue and at least one store queue.

4. The method of claim 1, wherein the step of executing the stored load operation after the load/store dependencies and the cache dependencies have been resolved further comprises, sending the stored load operation to the at least one pipeline for execution.

5. The method of claim 4, wherein the step of sending the stored load operation to the at least one pipeline for execution after the load/store dependencies and the cache dependencies are resolved further comprises, fetching a cache line back from a different cache level in response to the cache miss.

6. An apparatus for detecting address dependencies of load/store operations in a memory system, comprising:
   at least one pipeline of the load/store operations that interfaces a plurality of pipeline comparators, at least one load miss queue that interfaces a plurality of load miss comparators and is at least configured to store load operations;
   at least one store queue that interfaces a plurality of store comparators and is at least configured to store store operations;
   the plurality of pipeline comparators, load miss comparators, and store comparators that interface load/store dependency logic and that are at least configured to detect address matches with an incoming load/store operation; and
   the load/store dependency logic that is at least configured to detect load/store dependencies, wherein the load/store dependency logic further comprises:
   a means to determine if an incoming load/store operation is a cache hit or a cache miss;
   a means to dynamically change the address width for detection of an address match with the incoming load/store operation in response to the determination of the cache hit or cache miss;
   wherein the load/store dependency logic further comprises, a means to adjust, to a specific address width for detection of the address match upon the determination of the cache hit and to adjust to a smaller address width for detection of the address match upon the determination of the cache miss;
   wherein the load/store dependency logic further comprises, a means to adjust to quadword boundary for the cache hit and to adjust to cacheline boundary for the cache miss.

7. The apparatus of claim 6, wherein the at least one load miss queue and the at least one store queue are combined to form one unified queue.

8. The apparatus of claim 6, wherein the pipeline of load/store operations is at least configured to execute load/store operations or send load/store operations to the appropriate queue.

9. The apparatus of claim 6, wherein the load/store dependency logic further comprises, a means to fetch a cache line back from a different cache level upon the determination of the cache miss.

10. A computer program product fixed in a computer readable medium and executable by a process for detecting load/store dependencies of load/store operations in a memory system containing at least one pipeline of operations, wherein the computer program comprises:

computer code for determining whether the address values of an incoming load operation is a cache hit or a cache miss;
 upon a determination that the incoming load operation is the cache hit, computer code for comparing the address value of the incoming load operation to the operations in the at least one pipeline to determine an address match by using a specific address width wherein the specific address width is a quadword boundary address width;
 upon a determination that the incoming load operation is the cache miss, computer code for comparing the address value of the incoming load operation to the operations in the at least one pipeline to determine the address match by using a smaller address width wherein the specific address width is a cacheline boundary address width;
 computer code for executing the incoming load operation if the load operation is the cache hit and shows no address match;
 computer code for storing the incoming load operation if the load operation is the cache miss and the address match; and
 computer code for executing the stored load operation after the load/store dependencies and cache dependencies have been resolved.

11. The computer program product of claim 10, wherein the at least one pipeline further comprises at least one queue.

12. The computer program product of claim 11, wherein the at least one queue further comprises at least one load miss queue and at least one store queue.

13. The computer program product of claim 10, wherein the computer code for executing the stored load operation after the load/store dependencies and the cache dependencies have been resolved further comprises, sending the stored load operation to the at least one pipeline for execution.

14. The computer program product of claim 13, wherein the computer code for sending the stored load operation to the at least one pipeline for execution after the load/store dependencies and the cache dependencies are resolved further comprises, fetching a cache line back from a different cache level in response to the cache miss.

* * * * *